UNITED STATES PATENT OFFICE.

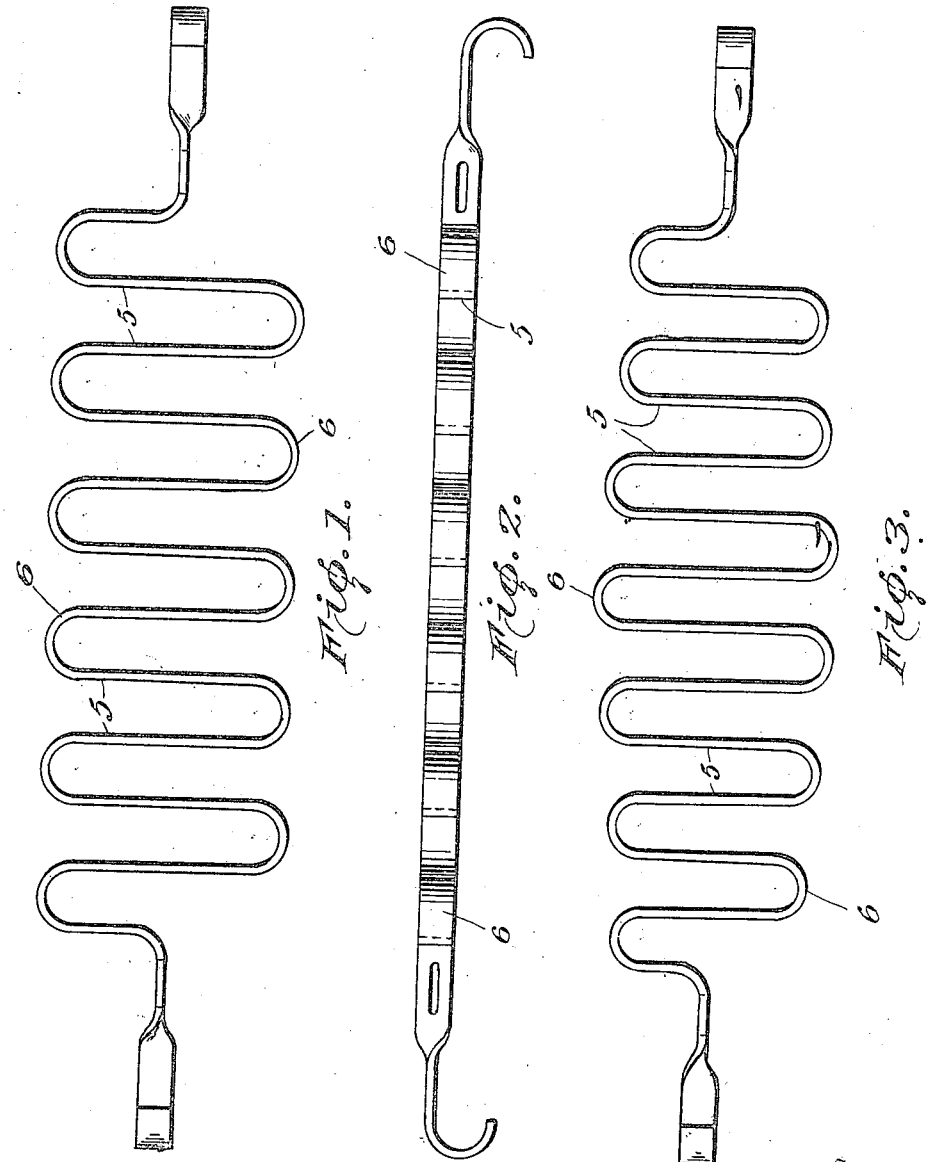

HUGO B. GRANT, OF CHICAGO, ILLINOIS.

BUMPER.

Application filed October 27, 1921. Serial No. 510,717.

*To all whom it may concern:*

Be it known that I, HUGO B. GRANT, a citizen of the United States, residing at Chicago, in the county of Cook and State of Illinois, have invented new and useful Improvements in Bumpers, of which the following is a specification.

This invention relates to automobile bumpers or fenders consisting of a cross bar mounted in front of, and in some instances also to the rear of the car.

The invention has for its object to provide a very simple and efficient device of the kind stated consisting of a single flat bar which is so fashioned and arranged that the device is given a greater height than the width of the bar in order to obtain a maximum protective area with a minimum width of material.

The invention is illustrated in the accompanying drawing, the same showing in Fig. 1 a front elevation; Fig. 2 a top plan view of the device, and Fig. 3 is a front elevation showing another form of the invention.

Referring specifically to the drawing, the improved bumper or fender, consists of a flat bar or strip of steel or other suitable metal which is made with transverse bends extending back and forth to give the bar a sinuous form, and thus produce a series of parallel and laterally spaced portions 5 connected by return bends 6. At its ends, the bar is left flat for attachment to the car in any approved manner.

The bar is positioned on the car in such a way as to have its edges facing forwardly and rearwardly, which places the parts 5 in vertical position, as shown in Fig. 1. This arrangement produces a large frontal area of greater height than if the bar were placed with its sides facing forwardly and rearwardly, for the reason that the height of the parts 5 is considerably greater than the width of the bar. It is therefore possible to use a relatively narrow bar, which is advantageous owing to the fact that such a bar is cheaper and lighter than the stock usually employed for automobile fenders. The sinuous form of the bar gives it sufficient strength and rigidity to successfully withstand the shocks to which it may be subjected.

The bumper or fender, shown in Fig. 3 does not differ from the one just described except that it is higher at the middle than at its ends, it being tapered toward the latter.

It is to be understood that the invention is not limited to a fender composed of a flat bar, but that it may also be constructed of round stock, tubing, etc.

I claim:

1. An automobile fender consisting of a flat bar having a sinuous form and positioned with its edges facing forwardly and rearwardly, said bar having longitudinally projecting attaching portions at its ends.

2. An automobile fender consisting of a flat bar having transverse bends to obtain a sinuous form and to produce a series of parallel and laterally spaced vertical portions connected by return bends, and having a height which is greater than the width of the bar, said vertical portions having their edges facing forwardly and rearwardly, said bar having longitudinally projecting attaching portions at its ends.

3. An automobile fender consisting of a bar having a sinuous form to produce a series of parallel and laterally spaced portions in a substantially vertical plane, said bar having longitudinally projecting attaching portions at its ends.

In testimony whereof I affix my signature.

HUGO B. GRANT.